United States Patent [19]

Avny

[11] Patent Number: 4,760,907
[45] Date of Patent: Aug. 2, 1988

[54] VARIABLE LEAD DIFFERENTIAL TRAVEL LIMITING MECHANISM

[75] Inventor: Eli Avny, Rockford, Ill.

[73] Assignee: Sundstrand Corporation, Rockford, Ill.

[21] Appl. No.: 912,786

[22] Filed: Sep. 29, 1986

[51] Int. Cl.⁴ .................. F16D 11/08; F16H 25/12
[52] U.S. Cl. ..................... 192/141; 74/57; 74/424.8 B; 74/569
[58] Field of Search .................. 74/424.8 B, 59, 58, 74/57, 569, 665 D, 665 E; 192/94, 141

[56] References Cited

U.S. PATENT DOCUMENTS

| 597,365 | 1/1898 | Rothwell | 74/57 |
|---|---|---|---|
| 781,825 | 2/1905 | Hedgeland | 192/50 |
| 1,746,545 | 2/1930 | Malm | 74/57 |
| 1,780,398 | 11/1930 | Morgan | 74/57 |
| 1,868,254 | 7/1932 | Reaves | 192/47 |
| 2,077,253 | 4/1937 | Nardone | 192/48.1 |
| 2,251,838 | 8/1941 | Baker | 74/57 |
| 2,268,601 | 1/1942 | Knox | 180/9.2 |
| 2,315,110 | 3/1943 | Dornier | 74/57 |
| 2,441,596 | 5/1948 | Reitter | 74/57 |
| 2,495,016 | 1/1950 | Mesick | 74/710.5 |
| 2,504,018 | 4/1950 | Gibson et al. | 192/48.1 |
| 2,630,024 | 3/1953 | Pontrello | 74/711 |
| 2,818,743 | 1/1958 | Zatsky | 74/57 |
| 2,860,266 | 11/1958 | Schrader | 310/112 |
| 2,860,713 | 11/1958 | Peterson | 170/135.75 |
| 2,906,129 | 9/1959 | Redd | 74/57 |
| 2,985,035 | 5/1961 | Toth | 74/711 |
| 3,106,997 | 10/1963 | White | 192/4 |
| 3,122,026 | 2/1964 | Pearson et al. | 74/59 |
| 3,159,046 | 12/1964 | Harned et al. | 74/424.8 |
| 3,253,413 | 5/1966 | Moran | 74/59 |
| 3,353,643 | 11/1967 | Adamson et al. | 192/141 |
| 3,612,428 | 10/1971 | Hohle-Halske | 74/57 |
| 3,650,156 | 3/1972 | Thomas | 74/10.2 |
| 3,668,940 | 6/1972 | Avena et al. | 74/57 |
| 3,927,574 | 12/1975 | Rice | 74/57 |
| 3,935,754 | 2/1976 | Comollo | 74/665 F |
| 4,064,981 | 12/1977 | House et al. | 192/141 |
| 4,143,747 | 3/1979 | Langieri, Jr. et al. | 192/89 W |
| 4,179,944 | 12/1979 | Conner | 74/89.15 |
| 4,351,635 | 9/1982 | Staedeli | 440/75 |
| 4,441,675 | 4/1984 | Boehringer et al. | 244/213 |
| 4,452,103 | 6/1984 | Lijewski et al. | 74/57 |
| 4,592,244 | 6/1986 | Nagata et al. | 74/57 |
| 4,597,819 | 7/1986 | Kusuhara et al. | 74/57 |
| 4,614,128 | 9/1986 | Fickler | 74/424.8 B |
| 4,643,290 | 2/1987 | Metcalf et al. | 192/141 |

FOREIGN PATENT DOCUMENTS

| 0212331 | 9/1908 | Fed. Rep. of Germany | 192/141 |
|---|---|---|---|
| 0344338 | 10/1920 | Fed. Rep. of Germany | 192/141 |
| 0119255 | 9/1980 | Japan | 74/665 E |
| 5025/82-5 | 8/1982 | Switzerland | 74/57 |
| 0552485 | 4/1943 | United Kingdom | 192/141 |
| 0676788 | 7/1979 | U.S.S.R. | 192/141 |

Primary Examiner—Leslie A. Braun
Assistant Examiner—Scott Anchell
Attorney, Agent, or Firm—Wood, Dalton, Phillips, Mason & Rowe

[57] ABSTRACT

An apparatus is provided for limiting the relative rotation between coaxial shafts, including a helical thread about one of the shafts, a nut having a follower received in the helical thread, a spline connection between the nut and other shaft, and means for limiting axial motion of the nut when the shafts are at a selected limit of relative rotation. The follower has a large finger supporting a small finger, and the one shaft has a middle section radially spaced farther from the other shaft than the end sections. The helical thread receives only the small finger along the shaft middle section, and receives the large finger in the shaft end sections when the shafts reach the selected limit of relative rotation. The helical thread about the shaft end sections has a larger lead angle than the thread about the middle section.

12 Claims, 1 Drawing Sheet

VARIABLE LEAD DIFFERENTIAL TRAVEL LIMITING MECHANISM

DESCRIPTION

1. Technical Field

The present invention relates generally to limiting shaft rotation, and more particularly to an apparatus adapted to limit differential rotation of two shafts.

2. Description of the Prior Art

In many apparatuses having rotary drive members and the like, it is desirable to limit the differential rotation of two drive members which operate independently under normal conditions. For example, with flap actuation mechanisms where different motors drive the flaps on opposing wings of an aircraft, it is critical for safety that no more than a predetermined asymmetry between the flaps be allowed. In those cases where one of the motors fails, it is therefore critical that the operating motor drive the flaps on both wings.

There are in the prior art a number of structures which are responsive to an asymmetry between two rotating shafts. For example, U.S. Pat. No. 2,495,016 discloses a structure in which an automobile differential is locked by a traveling nut when selected asymmetry between two shafts is reached. Also, U.S. Pat. Nos. 4,441,675 and 3,935,754 disclose systems operable in response to asymmetry in aircraft flap actuators, the former having a shutoff valve responsive to any asymmetry and the latter having an electrical counter which measures asymmetry.

These prior art structures, however, either do not allow for large amounts of relative rotation (U.S. Pat. No. 4,441,675) or, if they do, require correspondingly large, and thus heavy, components (U.S. Pat. No. 2,495,016), a particular disadvantage in aircraft, or they do not provide the positive reliability of a directly acting mechanical structure (U.S. Pat. No. 3,935,754).

The present invention is directed toward overcoming one or more of the problems as set forth above.

SUMMARY OF THE INVENTION

It is an object of the present invention to provide a structure which mechanically fixes two shafts for rotation together once a selected limit of relative rotation has been reached. It is yet another object of the present invention to provide a compact structure in which large amounts of relative rotation can be provided between limits.

In one aspect of the present invention, these objects are realized in an apparatus for limiting the relative rotation between coaxial shafts, including a helical thread about one of the shafts, a nut having a follower received in the helical thread, a spline connection between the nut and other shaft, and means for limiting axial motion of the nut when the shafts are at a selected limit of relative rotation.

In another aspect of the present invention, the follower has a large finger supporting a small finger, and the one shaft has a middle section radially spaced farther from the other shaft than the end sections. The helical thread relatives only the small follower finger along the shaft middle section, and receives the large follower finger in the shaft end sections when the shafts reach the selected limit of relative rotation.

In yet another aspect of the present invention, the helical thread about the shaft end sections has a larger lead angle than the thread about the middle section.

DESCRIPTION OF THE PREFERRED EMBODIMENT

Figure 1:
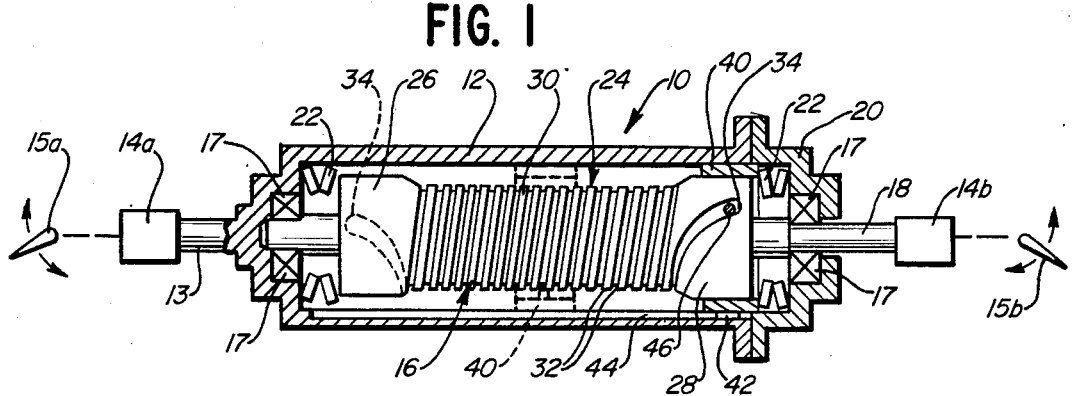
FIG. 1 is a cross-sectional view of the differential rotation limiting apparatus.

The differential rotation limiting apparatus 10 is shown in FIG. 1 having a generally tubular shaft 12 suitably mounted for rotation and drivably connected through a drive shaft 13 to one drive member as, for example, the rotary drive member (shown schematically at 14a) for the actuator for the flap 15a of one aircraft wing. A second shaft 16 is journaled by bearings 17 for rotation within the cylindrical shaft 12 and includes a drive shaft 18 drivably connected to a second drive member as, for example, the rotary drive member (shown schematically at 14b) for the actuator for the flap 15b of the other aircraft wing.

A cap 20 is suitably secured to one end of the cylindrical shaft 12 and suitable springs 22 such as Belleville washers are provided at opposite ends of the enclosure defined by the cylindrical shaft 12 and cap 20.

The second shaft 16 has a threaded section 24 between the springs 22 including two end sections 26,28 and a reduced diameter middle section 30. The middle section 30 includes a helical thread 32 therearound comprising a shallow, narrow groove with a small lead angle. In the end sections 26,28 the helical thread 32 is formed of a deeper end groove having a lead angle which increases until the groove is virtually axial (at reference numeral 34).

A follower nut 40 is provided within the cylindrical shaft 12 and around the second shaft 16. The follower nut 40 is suitably secured for rotation with the cylindrical shaft 12, as by the flange 42 and slot 44 connection shown. The slot 44 extends axially on the interior of the shaft 12. Thus axial motion of the nut 40 relative to the cylindrical shaft 12 is allowed while relative rotation is prevented.

Figure 2:
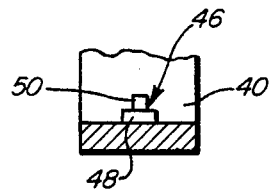
FIG. 2 is a fragmentary cross-sectional view of the follower nut.

The follower nut 40 also includes a follower 46 on its inner periphery with a large finger 48 supporting a small finger 50 (see FIG. 2). The follower 46 is thus disposed so that only the small finger 50 is received in the small lead angle helical thread 32 about the shaft middle section 30 when the nut is between the end sections 26,28. Both the small finger 50 and the large finger 48 are received in the increasing lead angle helical thread 34 in either shaft end section 26,28. (Note that the follower 46 would travel a linear path, and is shown in phantom in FIG. 1 oriented about 90° from the follower 46 as shown at the right end of FIG. 1 only in order to illustrate the position of finger 50 in the middle section helical thread 32.)

Operation is thus as follows. When the shafts 12,16 are turning freely relative to one another within their travel limits, the follower nut 40 is generally disposed over the shaft middle section 30 with the follower small finger 50 under minimal load within the helical thread 32. In this position, relative rotation between the shafts 12,16 will cause the follower nut 40 to move axially as its follower 46 moves in the helical thread 32. The small lead angle of the helical thread 32 in the shaft middle section 30 allows for large numbers of relative rotation to be permitted between limits for relatively short limiting apparatuses 10.

When the shafts 12,16 approach the selected limits to their relative rotation, the follower nut 40 reaches a shaft end section (26 or 28, depending upon the direction of relative rotation) and its large finger 48 enters the thread 34 therein. The nut 40 also engages the spring 22 at that end section 26 or 28 and the spring 22 applies a force hindering further axial motion by the nut 40 (and thereby also creating a torque against further relative rotation between the shafts 12,16). This force increases with further relative rotation until it is sufficient to prevent further axial motion. The follower nut 40 (being held against further axial motion) thereby acts through the large finger 48 (which will withstand the larger forces involved in the limiting action) to secure the shafts 12,16 together without any further relative rotation in that direction. Should the drive force be reversed, relative rotation between the shafts 12,16 would be allowed (since the apparatus 10 does not jam) until the follower nut 40 reaches the other end section 28 or 26 at which time similar limiting action would occur.

Variations on the apparatus 10 shown in the figures can also be used within the scope of the present invention. For example, the inner shaft could have a spline connection with a follower nut having its follower on the outer periphery, the follower being received in a helical thread inside a cylindrical shaft having an increased inner diameter at the end sections.

Other aspects, objects and advantages of the present invention can be obtained from a study of the drawings, the specification and the appended claims.

What is claimed is:

1. An apparatus for limiting the relative rotation between coaxial shafts, comprising:
   a helical thread about one of the shafts, said one shaft having a middle section and two end sections, said middle section being radially spaced farther from said other shaft than the end sections;
   a nut having a follower received in the helical thread, the follower having a large finger and a small finger;
   means for securing the nut for rotation with the other of the shafts and for allowing axial motion of the nut relative to said other shaft; and
   means for limiting axial motion of the nut when the two shafts are at a selected limit of relative rotation;
   wherein the helical thread receives only the small finger along the shaft middle section, and receives the large finger in the shaft end sections when the shafts reach the selected limit of relative rotation.

2. The limiting apparatus of claim 1, wherein the allowing and securing means comprises an axial slot in said other shaft receiving a flange on the nut.

3. The limiting apparatus of claim 1, wherein the helical thread about the shaft end sections has a larger lead angle than the thread about the shaft middle section.

4. The limiting apparatus of claim 1, wherein the one shaft is received within the other shaft, said other shaft being cylindrical.

5. The limiting apparatus of claim 4, wherein the limiting means comprises a compression spring having one end fixed relative to the cylindrical shaft and the other end adapted to engage the nut when the two shafts are at the selected limit of rotation.

6. The limiting apparatus of claim 4, wherein the nut is secured for rotation with the cylindrical shaft and the helical thread is about said one shaft.

7. An apparatus for limiting the relative rotation between coaxial first and second shafts, said first shaft being cylindrical and said second shaft being received within the first shaft, comprising:
   a helical thread about the second shaft, said second shaft having a large diameter section and a small diameter section;
   a nut having a follower received in the helical thread, the follower having a large finger and a small finger;
   means for securing the nut for rotation with the first shaft and for allowing axial motion of the nut relative to the second shaft; and
   means for limiting axial motion of the nut when the shafts are at a selected limit of relative rotation;
   wherein the helical thread receives only the small finger along the small diameter section, and receives the large finger in the large diameter section when the shafts reach the selected limit of relative rotation.

8. The limiting apparatus of claim 7, wherein the helical thread about the large diameter section has a larger lead angle than the thread about the small diameter section.

9. An apparatus for limiting the relative rotation between two drive members, comprising:
   a first shaft drivably connected to one drive member, and including a tubular section;
   a second shaft drivably connected to the other drive member and having a section received coaxially within the tubular section, said second shaft section including a helical thread therein and having a middle section and two end sections, said middle section having a smaller diameter than the end sections;
   a follower nut disposed within the tubular section and having a spline connection therewith permitting axial motion, said follower nut further having a follower on its inner periphery having a large finger and a small finger received within the thread of the second shaft section; and
   means at opposite ends of the tubular section for limiting axial motion of the nut when the drive members are at a selected limit of relative rotation;
   wherein the helical thread receives only the small finger along the shaft middle section, and receives the large finger in the shaft end sections when the shafts reach the selected limit of relative rotation.

10. The apparatus of claim 9, wherein the helical thread about the shaft end sections has a larger lead angle than the thread about the shaft middle section.

11. The apparatus of claim 9, wherein the drive members drive respective flaps on opposite aircraft wings.

12. An apparatus for limiting the relative rotation between coaxial shafts, comprising:
   a nut having a follower with a large finger and a small finger;
   means for securing the nut for rotation with, and axial motion relative to, one of the shafts;
   a middle section and two end sections in the other shaft, said middle section being radially spaced farther from said one shaft than the end sections; and
   a helical thread about the other of said shafts, said helical thread receiving only the small finger along the shaft middle section, and receiving the large finger in the shaft end sections when the shafts reach a selected limit of relative rotation.

* * * * *